United States Patent
Raschke et al.

(10) Patent No.: US 6,653,933 B2
(45) Date of Patent: Nov. 25, 2003

(54) AUTONOMOUS LOCAL AREA DISTRIBUTED NETWORK

(75) Inventors: Steven K. Raschke, Oakland, CA (US); Robert B. Kane, Emeryville, CA (US)

(73) Assignee: emWare, Inc., Salt Lake City, UT (US)

( * ) Notice: Subject to any disclaimer, the term of this patent is extended or adjusted under 35 U.S.C. 154(b) by 25 days.

(21) Appl. No.: 09/932,589

(22) Filed: Aug. 17, 2001

(65) Prior Publication Data

US 2002/0067717 A1 Jun. 6, 2002

Related U.S. Application Data

(60) Provisional application No. 60/226,478, filed on Aug. 18, 2000.

(51) Int. Cl.$^7$ .............................................. H04M 11/04

(52) U.S. Cl. ............................ 340/310.01; 340/310.02; 340/332; 362/233; 362/272; 362/284; 315/312

(58) Field of Search ....................... 340/310.01, 310.02, 340/332; 362/233, 272, 284; 315/312

(56) References Cited

U.S. PATENT DOCUMENTS

| | | | | |
|---|---|---|---|---|
| 4,200,862 A | * | 4/1980 | Campbell et al. | 340/310.01 |
| 5,109,222 A | * | 4/1992 | Welty | 340/825.72 |
| 5,938,757 A | * | 8/1999 | Bertsch | 712/36 |
| 6,229,433 B1 | * | 5/2001 | Rye et al. | 340/310.01 |
| 6,331,813 B1 | * | 12/2001 | Belliveau | 340/310.01 |

* cited by examiner

*Primary Examiner*—Daniel J. Wu
*Assistant Examiner*—Tai T. Nguyen
(74) *Attorney, Agent, or Firm*—Madson & Metcalf

(57) ABSTRACT

An autonomous local area distributed network provides a peer-to-peer network to connect nodes and devices using low cost and low bandwidth communication techniques, thus allowing the network to share node resources and distribute programming tasks across the different nodes. Home appliances and devices such as refrigerators, televisions, light switches, light fixtures, garage door openers, stereos, and the like may be configured as nodes on the peer-to-peer network. Operational programs, referred to as "sequences," may be distributed across nodes in a network to enable the maximum utilization of available node resources.

4 Claims, 6 Drawing Sheets

GLOBAL TABLE - 300

| ALIAS | SERVICE | METHOD | UNIT OF MEASURE | DATATYPE | R/W | RANGE |
|---|---|---|---|---|---|---|
| 1000 | Illumination | Increment | Watts | Long | Read/Write | 0-1 |
| 1001 | Illumination | Decrement | Watts | Long | Read/Write | 0-1 |
| 1002 | Illumination | On/Off | -- | Binary | Read | 0-1 |
| 1003 | Television Control | Change Channel | -- | Long | Write | 0-999 |
| 1004 | Television Control | Volume Decrement | -- | Short | Write | 0-100 |

FIG 3

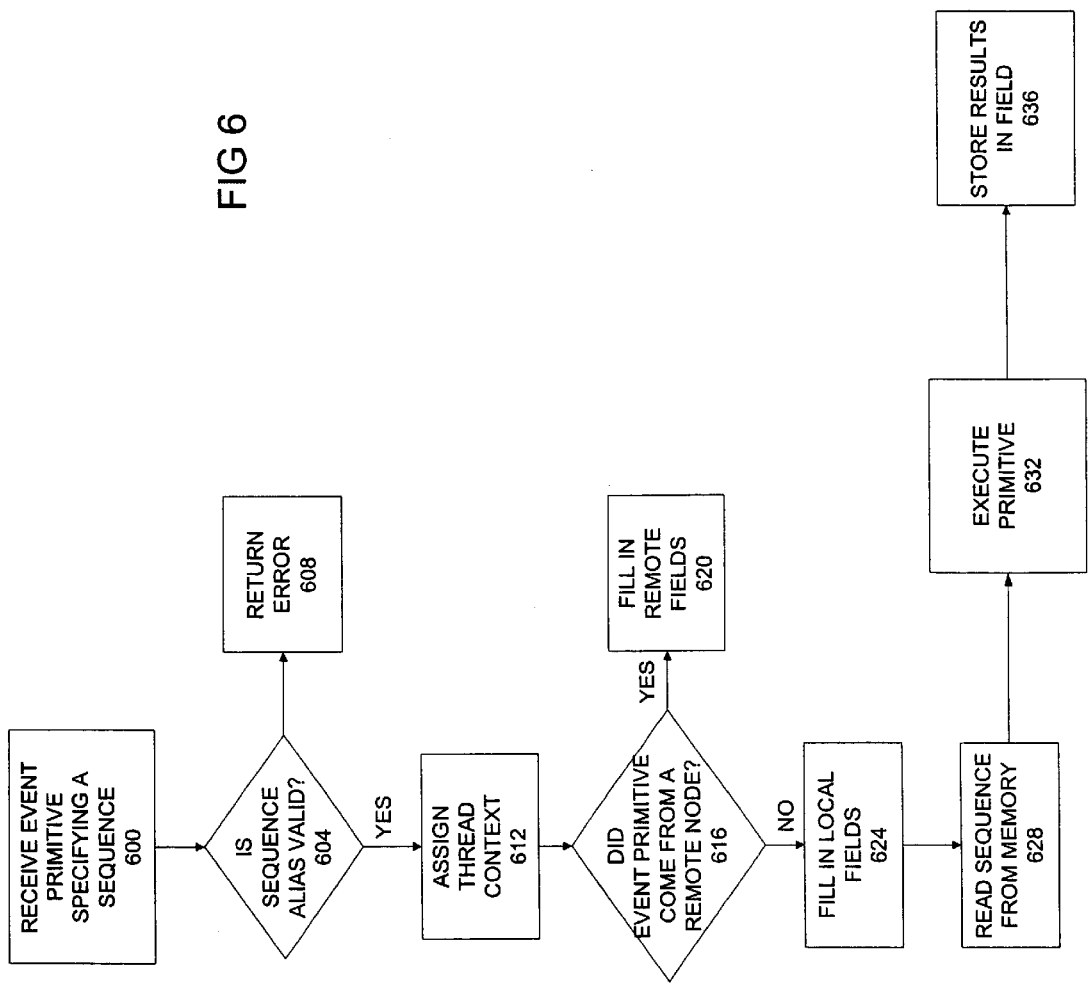

AUTONOMOUS LOCAL AREA DISTRIBUTED NETWORK

RELATED APPLICATIONS

This application claims priority under 35 U.S.C 119(e) from U.S. provisional patent application Ser. No. 60/226,478, filed on Aug. 18, 2000, entitled "Autonomous Local Area Distributed Network", which is incorporated by reference herein in its entirety.

FIELD OF THE INVENTION

The present invention relates to local networks, and more specifically to a peer-to-peer distributed local network.

BACKGROUND OF THE INVENTION

Modern technology has advanced to enable the possibility of creating home networks using "smart" appliances. Conventionally, these smart appliance networks in the home are coupled together with a server or other computer-like "master" controller over a local area network ("LAN"). The appliances are internally coupled to sophisticated microprocessors which in turn are connected via the LAN to the even more powerful processor in the server or master controller, on which network-related command, control and other functions of the appliances depend. Thus, the smart appliance and the master controller on the LAN function in "Master-Slave" or the well-known "Client-Server" fashion. In these networks, the master device is responsible for controlling the operations of the slave-"smart appliances", and manages all complex operations and program, such that the appliances themselves do little more than act on very specific commands issued by the master device (e.g., to turn themselves on or off).

In order to maximize the value of these home networks, they can further be connected to a wide area network ("WAN", such as the Internet) through the local server and via a "gateway" to allow remote control and monitoring of the smart appliance functionality. This gateway can be combined with the local server or exist as a separate device, such as a modem, which the server routes LAN messages through to the WAN. A remote user that wishes to remotely control or monitor the functionality of a smart appliance will connect through the gateway to the home server, which receives, queues, and parses commands to and from the individual appliances.

Although this conventional configuration achieves many goals of a home network, it is inefficient and expensive to manufacture and install for the mass market. An expensive local server, set-top box, or other powerful computer-like device must first be present in the home to enable the smart appliance network, and must be maintained to manage the process. Moreover, the home must accommodate the server, which is typically bulky, often noisy, and generates heat. Additionally, the cost of the gateway must be added the server in order to allow remote control and monitoring. Within the home, each appliance requires its own expensive processor, and is a "client" or "slave" to the network. Moreover, the communication methods used within the local area network are also bulky and inefficient, typically modeled on Internet messaging standards that were not designed for appliance networking and thus requiring high cost, high bandwidth communication techniques which drives up the cost of the smart appliances. Thus, although this configuration is technically feasible, it is not an attractive solution for those wishing to install a smart appliance network in the home.

Therefore, a local network is needed that can connect appliances and devices in a network, enable the appliances and devices to be remotely controllable, and enhance the functionality of the appliances and devices without requiring the installation of a server, master controller or expensive processors and communication techniques.

SUMMARY OF INVENTION

An autonomous local area distributed network connects devices whose purpose is not primarily general computing into a network in a peer-to-peer configuration that requires only low cost, low bandwidth communication techniques and only an occasional connection to a remote server. A node circuit is coupled to or embedded within a device to enable network connectivity in the device. Each node is coupled together through a communications facility over a bus. A remote server connects to the network via a modem and initializes the nodes, and thereafter the nodes act in a peer-to-peer, autonomous manner. The network is designed to provide true peer-to-peer computing and connectivity, thus allowing the nodes to share resources and distribute programming tasks across the different nodes. The remote server initializes the network into an optimal configuration for the particular network responsive to the type and number of nodes and devices on the network. The network communications are optimized for smart appliance applications. Such optimization and peer-to-peer architecture allow the nodes to employ a low-cost, relatively simple design, thus reducing the costs of creating the smart appliance network. Moreover, the peer-to-peer configuration also eliminates the requirement of maintaining a server or master controller at the network site, and therefore eliminates the cost of the server as well. Thus, in one embodiment, devices such as refrigerators, televisions, light switches, light fixtures, garage door openers, stereos, and other primarily non-general computing devices may be configured as nodes on a network. In accordance with the present invention, each node interoperates with the other nodes to allow each node to be accessed by a user locally or remotely and to be configured or operated. For example, a user at work may access a website and verify that all lights are turned off in the user's home, and if lights are still on, the user may turn the lights off. Again, in contrast to conventional systems, this functionality is accomplished without requiring expensive processors or a local server to be installed in the home.

In one embodiment, a node operating system (NOS) provides the peer-to-peer networking capabilities. In this embodiment, each node interoperates within a computing system referred to as a domain. Each node within a domain can communicate at will with other nodes, execute programs distributed across nodes in the domain, execute programs in parallel, share resources across the domain, and serve as proxies for other nodes within the domain, without requiring any interaction or mediation with a master device. In one embodiment, each NOS operates internally as a shared tasking application, but is designed to hand off tasks and threads to itself and other nodes. In this embodiment, a domain-wide addressing scheme enables the physical layer connecting nodes to appear transparent to each node. Thus, instructions that are transmitted over a bus and executed by a remote node are treated as if the instruction had been executed by the transmitting node. This gives each node complete access to the memory space created by the shared nodes.

In a further embodiment, operational programs, referred to as "sequences," may be distributed across nodes in a network to enable the maximum utilization of available node resources. Sequences operate to provide instructions for specific nodes' features or instructions to execute other sequences. A sequence may be a program that enables the event of switching on a light in a home to trigger switching on other lights in the home. For example, if a user has several lights that lead from the bedroom to the kitchen, the user may desire a sequence that turns on all lights that lead to the kitchen on whenever the user turns on a particular bedroom light switch. Although this sequence requires the execution of operations by several different nodes (i.e., each of the lights along the selected path), the sequence itself may be executed by other nodes in the network (e.g., by a television node or a thermostat node), the execution resulting in commands being sent to the specific light switch nodes to turn on. The distribution of the execution of the sequence allows the network to distribute processing requirements more evenly across the network.

By contrast, in a conventional non peer-to-peer system, nodes can only execute the programs designed for operation by that node. Thus, each node must possess sufficient processing power to execute entire programs, and such programs can only be executed by the specific nodes for which they are written. Moreover, if a particular node is used more often than other nodes (a garage door opener vs. a rarely-used porch light), that node may be required to have more processing power to accommodate the execution of its tasks but the porch light node may have too much processing power to execute its infrequent tasks. However, the same high-performance processor is typically in all nodes, or, alternatively, each home must be custom-designed. Either option results in an expensive home network solution due to either the use of expensive components, or the loss of economies of scale and the need for very specific program development. Thus, by using the peer-to-peer configuration with distributed programming of the present invention, the nodes of a network provide full functionality without a prohibitive cost to the user.

BRIEF DESCRIPTION OF THE DRAWINGS

FIG. 3 is an illustration of a global addressing table in accordance with the present invention.

FIG. 6 is a flowchart for executing a sequence in accordance with the present invention.

DETAILED DESCRIPTION OF THE PREFERRED EMBODIMENTS

Figure 1:
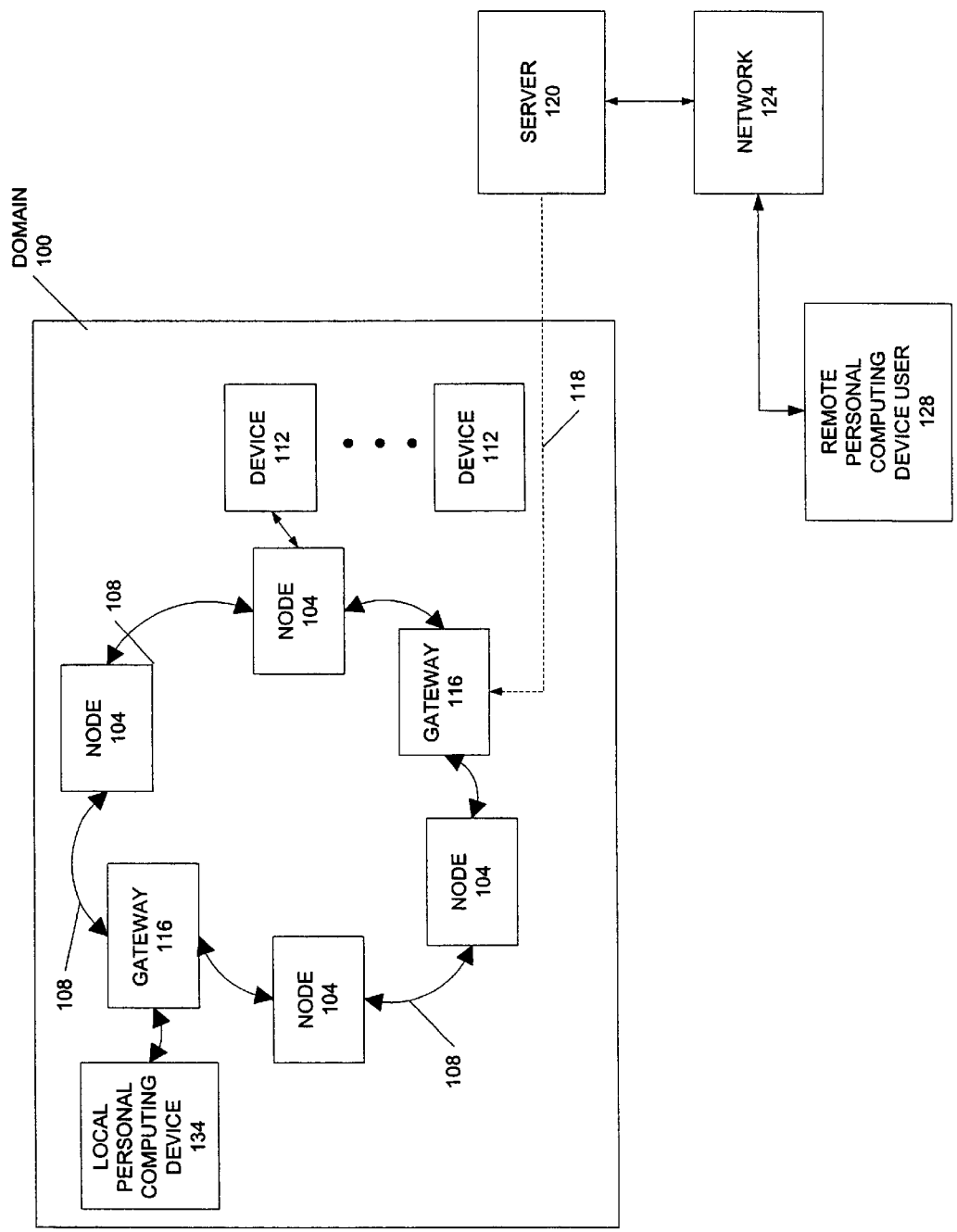
FIG. 1 is a block diagram of a local area network in accordance with the present invention.

FIG. 1 is a block diagram of a local area network in accordance with the present invention. In a preferred embodiment, a plurality of nodes 104 are coupled together in a delimited area referred to as a domain 100. The nodes 104 are network-enabling circuitry of the present invention, and are coupled to one or a plurality of devices 112. Nodes 104 can be built into a device, for example a node 104 built into a thermostat, a light switch, an electrical outlet, a clock, or any other electrical appliance. Alternatively, a node 104 may be a physically separate apparatus, and electrically and communicatively coupled to one or more devices. For example, a node may be coupled to a surge protector and which in turn has a plurality of outlets, and each outlet supports a device 112. Any electronic device may be coupled with a node 104 of the present invention, including televisions, washing machines, refrigerators, remote controls, lamps, telephones, outlets, power meters, and the like. Computers themselves may also be coupled into this network using the nodes 104 of the present invention. In the embodiment of FIG. 1, the nodes 104 are coupled together through an internal communications facility 108. The internal communications facility may be a power line, coaxial cables, twisted pair wiring, fiber optic cables, telephone cable, wireless connection, or the like. The nodes 104 are preferably coupled to a gateway 116 that provides external communication capability for the domain 100. A gateway 116 is coupled to a external communication facility 118, such as a telephone line, using a dial-up, T1, cable modem, or DSL connection, or a coaxial cable, fiber optic channel, wireless transmitter, or the like. The gateway 116 is a specifically designed node 104 for providing wide area network communication capability.

The communication facility 118 couples the gateway 116 to a remote server 120. The server 120, as discussed below, only connects to the domain 100 on an occasional basis, and is therefore not required to be locally maintained and always executing as is required by conventional systems. The server 120 may be any conventional computer, such as a personal computer, or a server class computer. The server 120, in one embodiment, initially configures nodes 104 of the domain 100, and then communicates with the domain 100 on an on-demand basis. The server 120 is connected to a wide area network 124, such as the Internet. This connection allows a user to access the server 120 from a remote personal computing device 128, such as a computer, a PDA, a cell phone, or the like. The user can use the remote personal computing device 128 in accordance with the present invention to configure, monitor, and issue commands to the user's domain 100. The user can use a local personal computing device 134 to perform similar functionality, provided that device can duplicate the functions of the remote server 120.

Each node 104 executes an operating system that enables the node 104 to communicate with other nodes 104 in a peer-to-peer configuration. This configuration allows the nodes 104 to employ low-cost hardware to execute their functionality, as processing tasks and resources may be distributed across the domain 100. The domain 100 itself may be considered to be a single processing device, using various node resources. One important aspect of the peer-to-peer configuration is addressing. Each node 104 is able to address any other node 104 directly without requiring intervention by a master controller or local server, as is required by conventional master-slave or client-server configurations being used by conventional smart appliance networking systems. In one embodiment, an absolute addressing scheme enables a node 104 to directly address other nodes 104, either individually or in a multicast configuration. In this embodiment, each node 104 is provided with a Globally Unique Identifier ("GUID")which is a long integer, and also preferably provided with a more compact Domain Unique Alias identifier ("DUA") which acts as an alias for the node's GUID within its particular domain 100. Each node 104 is also pre-defined with a list of devices 112 associated with the node 104 and attributes for the devices 112. The node 104 is typically pre-defined by the manufacturer. For example, a light switch may be a node of the present invention. Accordingly, the light switch manufacturer will pre-define the list of devices 112 (in this example, one device, the switch itself), and attributes for the device (in this example, the list may include on, off, and degrees of dimming for a dimmer type switch).

The addressing methodology of the present invention enables each node 104 to issue messages to other nodes 104. As will be described below, the messages sent to other nodes 104 instruct a device 112 or nodes 104 to perform certain functions. This allows sequences of events and services within a domain 100 to occur, and also enables the nodes 104 to distribute programming tasks and share resources. To transmit a message to a node 104, a sending node 104 identifies the receiving node 104 by its GUID or DUA. To request that the receiving node 104 to perform an action, the sending node 104 may directly address a device 112 on a node 104 or may send an attribute alias, as discussed below. To directly address a device 112 on a node 104, the sending node 104 includes in the message a device number and an attribute number. The device number specifies the device on a node 1004 to which a message is addressed, and the attribute number indicates the functionality the device 112 is to perform as is discussed in more detail below. The receiving node 104 interprets the message and executes it, and may, as a result, send further messages to other nodes 104. In this manner, processing of any desired sequence can be fully distributed over the network of node.

Figure 2:
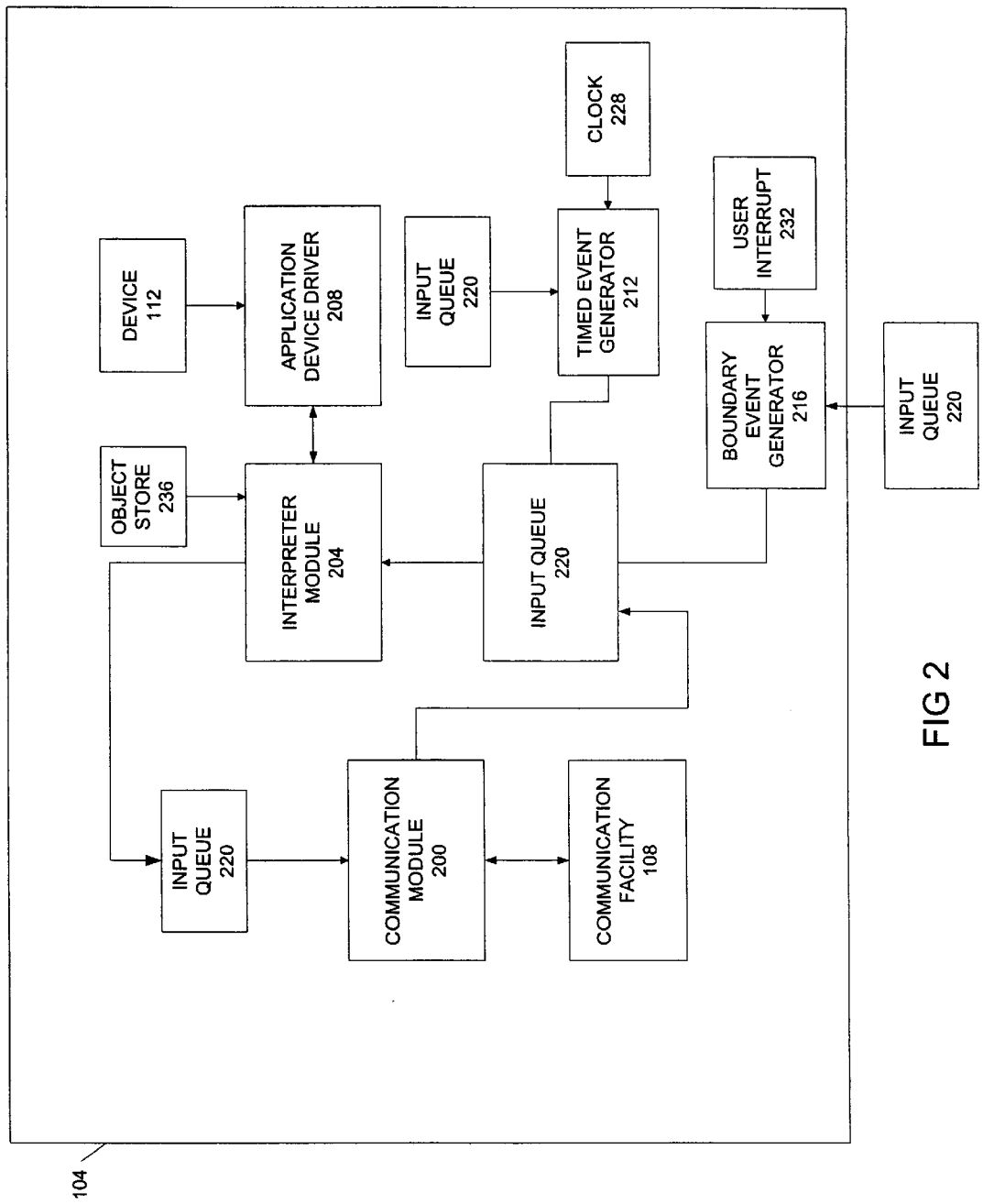
FIG. 2 is a functional block diagram of a node in accordance with the present invention.

FIG. 2 is a functional block diagram of a node 104 in accordance with the present invention. A node 104 preferably includes a microcontroller, such as the PIC18C microcontroller manufactured by Microchip Technologies™, coupled to firmware embedded in Read-Only Memory ("ROM"). In one embodiment of the present invention, nodes 104 communicate through conventional power line electrical wiring present in the home, office or other environments. One specific method for communicating over power lines is described in a co-pending U.S. patent application, Ser. No. 09/435,898, filed on Nov. 8, 1999, entitled "System for Transmitting Data Over Power Lines", which is hereby incorporated by reference. However, any other means of communication such as radio frequency may also be used, as discussed above. A communications module 200, typically a modem, enables the node 104 to send and receive messages over the communications facility 108, 118. Thus, in a power line embodiment, the communications module 200 includes a powerline modem that strips transmitted data off of the modulated power line and translates the signal into a binary form. Additionally, to send messages to other nodes 104, the gateway 116, or externally, the communications module 200 retrieves messages from its input queue 220, and transforms them into the appropriate form to be transmitted over the communications facility 108, 118. After translating a received message, the communication module 200 transfers the message to an input queue 220 of an interpreter module 204. Modules as described herein may be implemented as tasks in software, or in firmware, or hardware in accordance with the present invention.

The interpreter module 204 receives a translated message and determines what action must be taken. The translated message includes an event primitive. The event primitive is a string of information that defines functions performed by a node 104 or a device 112. In one embodiment, the event primitive includes parameters such as an operator, an operand, and a thread context. The operator is typically a command to instruct a node 104 or a device 112 to take certain action. For example, an operator sets a value for an attribute of a node 104; another operator writes error information to an error log file in a node 104. The operand parameter corresponds to the data that are read or written by the operator. The thread context includes values to indicate the results of actions commanded by the event primitives. For the purpose of this specification, the service or features performed by a device 112 are a plurality of functions that a device 112 or a node 104 provides to a user, such as "On", "Off", "Volume Up", and "Time of Day", etc. These features or services are represented as "attributes" from the perspective of a device 112 or a node 104. The attributes, as described below, refer to variables being addressed within a node or a device that controls the state of a feature or a service. The types of services or features that can be performed are dependent on the node 104 itself, and the nature of the devices 112 to which it is coupled. The sending node 104 may add a parameter or parameters to the event primitive. For example, if the command controls turning on or off a light, the parameter will specify whether the light is to be turned on or off.

The interpreter module 204 receives the event primitive and parses out the device and attribute information. Then, using the device and attribute information, the interpreter module 204 calls the appropriate device driver and passes the parameter information. Application device drivers 208 are software routines typically stored in ROM, flash or other memory that perform a specific functionality for a device. For example, a thermostat has a device driver that supports a set of features (services) associated with various attributes specific to the thermostat and not to a light switch. The device drivers 208 are typically created by a node/device manufacturer and placed into ROM. This allows each device manufacturer to develop custom routines to control their devices, but still enables the routines to be universally accessible by a system of the present invention.

In one embodiment, the interpreter module 204 retrieves data from its queue 220 one byte at a time, where the first byte is designated to specify the device/attribute information. If the device/attribute information does not involve executing a sequence (discussed below), the interpreter module 204 calls the appropriate device driver 208 to read the rest of the event primitive and perform the requested task. When the device driver 208 has completed execution, it returns control to the interpreter module 204.

An object store 236 is a non-volatile read-only memory (NVRAM) used for storing data files used by the node 104. The data files, referred to as objects, preferably include programs, sequences, data, and events. In one embodiment of the present invention, nodes 104 may act together to perform a series of operational programs loaded onto the domain called sequences. An example of the sequence may be:

node 1 on;

node 2 off;

node 3 volume up;

node 4 displays time of day.

In another embodiment, a sequence contains an instruction to execute another sequence. The sequences are maintained in the object store 236, and are read out and converted into event primitives by the interpreter 204. In a preferred embodiment, objects are predetermined, finite, and fixed at design, and may not be added or deleted from the object store 236. The object store 236 contains an index to allow the interpreter 204 to access its contents easily. Each object is preferably assigned an enumerated constant that identifies it uniquely. In one embodiment, objects can be transferred onto or off of a node 104 using a special event primitive command. This command moves data directly between the interpreter module 204 and the object store 236. This greatly improves the efficiency of the data transfer by eliminating the need for creating programs to transfer the raw data. The event primitive command thus enables the data transfer to occur independent of the node's main operations.

The objects in the object store 236 are also associated with various tasks on the NOS. Logs, Configuration Data, Statistics, Events, etc. are all kept within these objects. In one embodiment, the system supports the ability to write from scratch, overwrite, or append to an object. In alternative embodiments, it may also support more complicated operations such as insert or replace. For example, the Logs object contains two kinds of records: error logs and event logs. The error logs collect information for errors or faults occurring on nodes or devices. The error logs are retrieved later for diagnosing the system. The event logs collect information of any changes occurring to the attributes of the devices or nodes. In one embodiment, a flag is added for an attribute that needs to be logged. When an incident causes changes to the attribute with a flag, the incidence is written to the event log.

In the embodiment of FIG. 2, there are two other sources of input to the interpreter module 204. First, a timed event generator 212 generates event primitives for time-triggered events. The timed event generator 212 accepts an event descriptor entry in an input queue 220. The event descriptor entry (EDE) is a command that is executed at some specific time and for a certain number of times. An EDE is created by a controller software running on the server 120 to configure the domain 100 and the nodes 104. Any nodes on the domain 100 may send EDEs to another node or even itself. The function of the EDE is similar to a "to do list" in a conventional date book.

In one embodiment, the EDE specifies an event primitive and a time parameter for which the timed event generator 212 should trigger the event. Thus, the event descriptor entry may specify a "turn on light" event that is to occur at 7:30 a.m. each morning, Monday-Friday. The timed event generator 212 is coupled to a real-time clock 228. Thus, when the appropriate time occurs, the timed event generator 212 transmits the event primitive to the interpreter module 204 to have the event performed.

Second, a boundary event generator 216 is used to provide an additional source of event primitives. The boundary event generator 216 also accepts event descriptors into its input queue 220. The event descriptor entry for the boundary event generator 216 specifies an event primitive to be performed by a device 112 and a threshold of some type that must be reached or crossed prior to the event primitive being transmitted to the interpreter module 204. For example, if the node 104 is coupled to a thermostat, the threshold may be a selected temperature, and the event primitive may be to turn off heat-generating appliances when the current temperature exceeds the selected temperature.

In order to know when an attribute, e.g., temperature, exceeds a threshold value, one embodiment of the boundary event generator 216 keeps a list of the various attribute values associated with the EDE. A flag is associated with an attribute that the boundary event generator 216 monitors. Whenever an attribute with the flag is updated, the device driver recognizes the change and triggers the boundary event generator 216 to check if there is a flag associating with any attribute. If an attribute has a flag, the boundary event generator 216 further checks the list to see if a threshold has been exceeded. When the threshold is exceeded, the boundary event generator 216 transmits the EDE to interpreter module 204 to execute.

As understood above, such EDEs are not limited to sequences to take action in the local node 104. The node 104 may generate event primitives intended for other nodes.

FIG. 3 illustrates a global direct addressing table 300 in accordance with the present invention that allows sending nodes 104 to transmit event primitives without requiring the sending nodes 104 to be aware of the specific configuration of the receiving node 104. Additionally, the global table 300 allows messages to be transmitted in a multicast manner. The global addressing table 300 is a list of different event primitives and provides an alias for each primitive. The alias numbering system is preferably an ordered list of the possible event primitives that could be executed by different devices. Thus, in this example alias 1000 in FIG. 3 is the event primitive for incrementing the brightness of a light. Alias 1001 is the event primitive for decrementing the brightness of a light. Event 1004 is the event primitive for decrementing the volume of a television, and so forth. Each entry in the table specifies all of the information that a device may need to implement a specific functionality. In the example of FIG. 3, each entry has a service, that specifies the overall functionality to be performed, a method, which is a subset of the overall service, a unit of measure, e.g., Celsius, centimeters, etc., a data type, long, short, binary, whether the primitive is a read or write, and range, which indicates the possible values for that field. A range for a light switch is 0 or 1 (off or on), whereas range for change channel of a television may be 0–999, depending on how many channels are present in the television.

Figure 4:
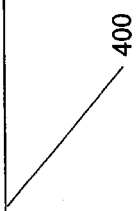
FIG. 4 is an illustration of an attribute alias table in accordance with the present invention.

FIG. 4 illustrates an attribute alias table 400 in accordance with the present invention. In a preferred embodiment, the attribute alias table 400 is stored in a permanent memory on the node 104. In one embodiment, the manufacturer of a device 112 to be network-enabled determines the various attributes the device 112 will provide, and, based on the global attribute table 300, assign an alias to each attribute. Thus, if a device manufacturer is enabling a television for use with the present invention, the manufacturer creates an attribute alias table that has an alias for a channel change event, such as alias 1003 'Change Channel'. The node 104 maps each alias with the corresponding device number and attribute number using the table 400. Although a table 400 is described herein, any data structure could be used in accordance with the present invention. The device number is an arbitrary number provided by the node 104 that specifies to which of a plurality of devices coupled to the node 104 an alias refers. If there is only one device coupled to a node 104, the device number will be the same in all entries (e.g., "1"). The attribute field specifies to which of a plurality of attributes a device has the alias refers. The attribute field value is used to call the appropriate device driver 208. For example, in the attribute alias table, alias 1003 effects attribute 5, and the value "5" is used as an index to select the appropriate device driver which can perform a "channel change" function, using the desired parameters that would be passed in the event primitive.

Thus, in accordance with the present invention, a sending node 104 can cause an event to be executed by a receiving node 104 by simply transmitting an alias referring to the appropriate event, with the necessary parameters, if any. In one embodiment, each node is programmed by the server 120 with only those alias identifications it needs to know to carry out its tasks, thus keeping its alias and other address tables to a minimum size and keeping memory requirements and costs very low. A sending node 104 merely has to look up the correct alias value (e.g., "1003"), and send it to the appropriate node 104 to perform the desired functionality. Upon receiving the alias, the interpreter module 204 will determine the device and attribute information by examining the attribute alias table 400, matching the received alias with one of its stored alias values, and then execute the appropriate device driver 208 indicated by the attribute value. Thus, the alias method of the present invention allows a sending node 104 to multicast a message to all nodes 104 on the system. Those that support the designated attribute will act on the message. If a receiving node 104 does not have the alias specified in a received message in its attribute alias table 400, the node 104 discards the message and performs no action. Thus, for example, one light switch node 104 can multicast a message to every light switch node 104 in the house to have all of the lights in the house turn on. Importantly, this method does not require a sending node 104 to know each receiving node's domain unique address or the specific device attributes supported by each node. This allows each manufacturer to design a node 104 in accordance with the manufacturer's desires, as long as they provide an attribute alias table 400, and use aliases that are globally unique to avoid alias conflicts. Once a new node is added to the domain 100, all other nodes 104 can communicate with the new node 104 by simply sending out an alias message. The existing nodes 104 are not even required to know the address of the new node 104. Thus, the start up time of adding a new node 104 to a domain 10 is greatly minimized.

Alternately, if the address of the new node 104 is desired to be known by other nodes, e.g., a specific event primitive is configured to perform only by the new node 104, the new node's domain unique address is transmitted to the other nodes 104 which require the knowledge of the address of the new node 104, typically by the central server 120, which will connect upon the addition of a new node 104. As a result, the existing nodes 104 can address the new node 104 using its domain unique address and device attribute information.

In a preferred embodiment, nodes 104 are collectively capable of executing a sequence of events. For example, turning on a light switch in the morning may also cause a coffee pot to begin brewing. In this embodiment, a node 104 will receive an interrupt signal, for example, on its boundary event input queue 220 or timer input queue 220. The interrupt is generated by the physical act of turning on of the light switch, in the above example. Turning on the light switch changes the state of the device 112 coupled to the light switch node 104. This change of state is logged by the boundary event generator 216, which then determines whether this change of state causes an event primitive to be transmitted, as discussed above. If the boundary event generator 216 determines that the light switch event triggers an event primitive, the boundary event generator 216 will send the associated event primitive to the interpreter 204. The interpreter 204 receives the event primitive and then performs the action associated with the specified attribute. However, the attribute value specified may specify that a service be performed. A sequence representing the service includes a plurality of event primitives logically grouped together to achieve some end result. The different event primitives may be stored anywhere on the domain 100, and thus in other nodes. In the above example, the node 104 retrieves the sequence from the object store 232, one line of event primitive at a time, loads that line of event primitive into RAM, and transfers an event primitive one at a time to the interpreter 204 for execution at the hardware level that causes the light to turn on. If the sequence contains another sequence, then the current sequence is temporarily suspended and the additional sequence is interpreted. Once it completes the additional sequence, the interpreter 204 resumes executing the original sequence. In this way, many complex operations can be executed.

The sequences may also instruct the interpreter 204 to determine the time of day, and then issue an event primitive to the coffee pot node 104 to have the coffee pot node 104 turn on the coffee pot if the time of day is between a certain range. Thus, the interpreter 204 then retrieves the time from the real time clock 228, and compares the time to the range. If the current time of day were within the specified range, the interpreter 204 would either transmit a direct address or an alias to the communications module 200 specifying the turn-on coffee pot attribute. The communications module 200 translates the event primitive into the appropriate communications protocol as discussed above, and transmits the message to the coffee pot node 104. Upon receipt of the event primitive, the coffee pot node 104 will perform the requested action. If turning on the coffee pot were to trigger another action, then the attribute sent by the light node 104 would specify another attribute. The coffee pot node 104 would then execute the specified attribute.

In one embodiment, programming tasks are distributed across the domain 100, to minimize the burden of processing for each node 104 and therefore lessen the requirement of using sophisticated processors. Thus, if a node 104 is under-utilized, such as a node 104 coupled to a back porch light, programming tasks for a kitchen light node 104 may be distributed to the back porch light node 104. Thus, in the above example, after the interpreter 204 identifies that a service is to be performed, the kitchen light node 104 service may simply direct the interpreter 204 to transmit a message specifying a service for the back porch light node 104 to perform. Then, the back porch light node 104 will perform the actions necessary to determine the time of day and whether the current time is in the correct range, and then the back porch light node 104 will send the message to the coffee pot node 104 to begin brewing. Alternatively, the different actions can be distributed to multiple nodes 104 on the domain 100 even further. For example, the kitchen light switch node 104 may simply request that the back porch light node 104 return the current time of day, and the kitchen light switch node 104 will perform the remaining tasks itself.

The distribution of the program task is determined through controller software running on the server 120 or a configuration computer. A user may configure various sequences into the nodes on the domain 100. Nodes in themselves do not make these determinations but are programmed a head of time. Sequences can be created by the controller software according to a user interest and needs or any other applicable rules. Thus, in accordance with the present invention, the different tasks of a sequence may be distributed across the domain 100, thus a minimizing the processing burden of any single node 104.

In one embodiment, the interpreter module 204 is also responsible for managing the different threads of control that are created by the execution of primitives and sequences by a particular node 104. In this embodiment, each time a new local service is invoked, an interpreter 204 assigns an unused thread context number to the sequence. The interpreter 204 preferably tracks the state of each thread in a thread context table. In one embodiment, the interpreter 204 creates a new thread context for a sequence that is initiated as a result of another sequence, and create a new thread context for an event primitive that is to be executed directly, irrespective of whether the event primitive was generated from another sequence. The advantage is the ability to have one sequence call another as a subroutine and return the results back to the original calling routine. Thus, various efficient routines may be developed and used economically by the nodes within a same or different domains. The use of thread contexts allows one operation within a sequence to pass information to another operation. Using the information stored in the thread context table, a node 104 can perform complex procedures such as math operations, flow control, memory manipulation, and data processing.

Figure 5:
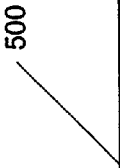
FIG. 5 illustrates one embodiment of a thread context table in accordance with the present invention.

FIG. 5 illustrates one embodiment of a thread context table 500. In this embodiment, a thread context value is used to uniquely identify a new thread. If there is a maximum number of threads that may be managed by a node 104 at one time, then the thread context value cannot exceed that maximum. A condition code is used to indicate the results of a previous event primitive operation. Condition codes are examined by branching primitives to determine actions to be taken. Some illustrative examples of condition codes include:

EQ, the result of a comparison was equal;

GT, the result was greater than;

PF, the previous primitive failed pathologically;

ER, the primitive was unsuccessful;

OF, an overflow occurred;

UF, an underflow or divide by zero occurred;

SR, a stored result flag that is set to determine whether information received from a pended request should be placed in a thread context data register or in a scratch pad data register.

A thread context data entry is used to store temporary data. A scratch pad data offset entry points to a scratch pad area that is used to store variable information. This area is controlled by the primitive itself. An originating thread context entry tracks the thread context assigned by an originating node 104. When the current node 104 executes the event primitive issued to it by the originating node 104 as part of a sequence, the current node 104 will reference this number in its reply. The originating node 104 could be the current node 104, if the originating node 104 called a sequence that called a second local sequence (which would have no thread context itself, as discussed above). An address pairing value is used to indicate the nature of the source and destination addresses used by the originating node 104. This enables the replying node 104 to use the correct address type (for example, short, or long, or GUID). A priority flag is used to indicate whether a thread is high or low priority. The interpreter 204 will examine the priority flag to determine the order in which to process an event primitive. The originating thread address entry is used to store the domain node address of the originator of a thread. This allows the node 104 to reply to the originating node 104 after the thread has executed. The reply size field is used to indicate the size of the expected reply. The sequence counter is used to indicate where the currently locating sequence resides (in effect, a program counter). Branch instructions can add or subtract from this counter when determining the next sequence to be executed. In one embodiment, several fields within the thread context table are stored in RAM and several fields are kept within the object store 236. The reply size field is an element of a row in RAM in the thread context table. A sequence label entry stores the alias of the sequence that initiates the thread context. This can be used to report errors. Thus, the thread context table 500 can be used to provide information allowing remote nodes 104 and local nodes 104 to act together to execute programs and caused connected events to cascade throughout a domain 100.

FIG. 6 is a flowchart illustrating executing a sequence in accordance with the present invention. First, an interpreter module 204 receives 600 an event primitive that specifies a sequence. Then, the interpreter 204 determines 604 whether the sequence alias specified is valid. If the alias specified does not correspond to the aliases maintained by the node 104, the interpreter 204 returns 608 an error. If the node 104 does maintain the specified alias, the node assigns 612 a thread context value for a new thread context. This value is usually incremented from the value of the last thread context. Additionally, the interpreter 204 adds the sequence label into the sequence label field, and the sequence region and offset information is placed in the region and offset field according to the information provided in the event primitive. Next, the interpreter 204 determines 616 whether or not the primitive was transmitted from a remote node 104 or the current node 104. The interpreter 204 determines the source of the event primitive from the address information specified in the primitive itself. If the event primitive is transmitted from a remote node 104, the remote node 104 information is entered 620 into the thread context table 500 as discussed above (e.g., filling in source and destination address information into the Address Pairing field and the Originating Thread Address field, and the thread context is placed in the Originating Thread Context field). If the event primitive is transmitted from the current node 104 itself, local information is entered 624 into the thread context table 500. For example, the Address Pairing field is given a value that indicates that the current node 104 is the originating node 104. If the new sequence was called by an existing sequence, then the original thread context is placed in the Originating Thread Context field. If the new sequence is being called for the first time by the local node, this is indicated by placing a special value in the OTC field.

Next, the sequence is retrieved 628 from memory using the offset information, and the event primitives contained in the service are processed 632 as described above. The execution of the thread may store 636 data in the thread counter data field, the scratch pad data, and may set a condition code in the condition code field. Upon completion, the device driver 208 passes control back to the interpreter 204. Then, a next instruction can examine these results and perform a branch if necessary. Once a sequence is complete, the reply information is completed in the field if a reply is needed. In one embodiment, the interpreter 204 checks the condition code field to see if an error has been logged. If no error was logged, the interpreter 204 knows that the sequence was successfully executed. If there was an error, the interpreter 204 logs this error and sends the reply to the originating node 104 indicating that an error occurred. If a new sequence must be created, a new entry is added to the thread context table 500, and the process begins again as described above. Thus, in accordance with the present invention, each node 104 provides thread control to enable each node 104 to issue commands to other nodes 104 and execute sequences involving other nodes 104, without the requirement of a master or expensive processors.

In a further embodiment, device-specific errors are logged in an error file. As mentioned above, each node 104 preferably maintains an error file to track errors and an event file to track events in the object store 236. These files can be used for maintenance and data mining. For example, if a particular device 112 repeatedly has an error performing device functionality, the error is logged. If a user of the device 112 notices the failure (i.e., the coffee pot fails to brew), the user may contact the device 112 manufacturer. The device manufacturer in turn may be able to access the error log to determine details of the failure, or to ascertain the source of the failure. In one embodiment, this type of remote access is possible through the connection of the nodes 104 to the gateway 116, and in turn to a central server 120. The device manufacturer may gain access to the node's error log after obtaining permission from the user through the central server 120 and the network 124. Additionally, each node 104 preferably tracks the occurrences of events performed by the node 104. For example, a node 104 connected to a light switch may track the number of times the light has been turned on and off.

In a preferred embodiment, nodes 104 can share resources, such as memory, by using the same method as distributing programs described above. As nodes 104 are in a peer-to-peer configuration, any node's file server 236 can request free memory from remote nodes 104 elsewhere on the domain 100. For example, a node 104 running low on event log memory can have its file server 236 route a memory request from the local (internal address) to a remote (some other node 104) address. The interpreter 204 formats a memory request into an event primitive, and places it on the input queue 220 of the communications module 200. A remote node's file server 236 with available memory will respond and the communications facility 118 is therefore used to transfer memory from the local node's event log to the remote node's event log. Since the event primitives and event logs are address-based, the physical location of the event log data has no effect on the meaning of that data. Once the request is granted, the source node 104 will add a pointer to its event log file to the proxy node 104. This pointer allows third a parties accessing the source node's event log to retrieve the correct information. Accordingly, nodes 104 on the domain can share resources, thus allowing an even distribution of the resource burden across the domain 100, minimizing the need for individual powerful processors.

It should be noted that a request from a node that requires a response from another node can be sent to only another single node. If a gateway 116 sends a multicast request from controller software running on the server 120, the controller software is configured to handle the multiple responses received from other nodes.

Thus, in one embodiment, nodes 104 share resources and have programs distributed to allow a functional node 104 to substitute or proxy for a non-functional node 104 or an out-of-range node 104. In this embodiment, an originating node 104 will associate an address of an alternate node with a thread generated by it when an event primitive is transferred to a destination node 104. If the thread breaks (i.e., the destination node 104 is offline or out of range), the originating node 104 will resend the event primitive to the alternate node. The alternate node 104 will substitute the destination node 104 to perform a function command by the event primitive. In another approach, the alternate node 104 acts as a proxy node to execute the event primitive as if it was the destination node 104 that responds to the originating node 104. By doing so, the nodes 104 are capable of performing distributed programming and communications across the different nodes to maximize the resource sharing and to overcome the problems of non-functioning nodes which is either offline or out of communication range.

In one embodiment, a gateway 116 provides the domain 100 an access to the server 120. In a preferred embodiment, the gateway 116 includes similar components as a node 104. However, the gateway 116 also includes an external communications module that is responsible for moving data between the gateway 116 and an off-domain communication mechanism, such as a modem. As described above, a controller software running on the server 120 communicates with the domain 100 through the gateway 116 under a variety of common communications protocols, such as POP, ETHERNET, RS232, PCI, TCP/IP, USB or POTS style GW. The gateway 116 transmits all data it receives from the domain 100 to the communication mechanism. The controller software is configured to understand and process all messages it receives. In one embodiment, the controller software receives messages addressed to the DUA of the gateway 116 to which it is attached. In an alternate embodiment, the gateway 116 is placed in a "promiscuous" mode so that the controller software can receive all messages seen on the Domain 100. Upon receipt of a message from outside the domain 100, the gateway 116 converts the message from its protocol, typically TCP/IP, into an event primitive message with a domain unique address specifying a node 104 in the domain 100. Then, the gateway 116 converts the event primitive into a protocol compatible with the communications facility 118 and transmits the message onto the domain 100.

The server 120 preferably connects at the initialization of a node 104 or domain 100, and thereafter connects only as circumstances require. In some instances, the server 120 may connect at an initial configuration and only be connected thereafter when the user attempts to configure the domain 100 remotely. Upon initialization, the server 120 provides each node 104 with a domain unique address that the node 104 will then use in its future peer-to-peer communication. The server 120 also retrieves a copy of each nodes' attribute alias table 400 and provides each node with the attribute aliases (and other dynamic data) necessary for them to function in their domain as specified by the server 120. Thus, the nodes have their own attribute aliases (those pertaining to their own device's services), and the aliases they will use when communicating with other nodes to complete the sequences or services they have been charged with. This allows each node 104 to directly request another node 104 to perform a command, by specifying the other node's domain unique address and the device and attribute values of the attribute the requesting node 104 would like the receiving node 104 to perform. Until the server 120 provides the copy of the table 400, however, each node 104 can still communicate using an attribute alias in accordance with the present invention. The copies of the table 400 are typically maintained in memory. After performing these simple functions, the server 120 can disconnect, and the domain 100 is self-sufficient and is able to provide the features and benefits described herein.

To issue a remote command, a user preferably uses a remote computer 128 to select a device and a command, for example, to turn off a light. The remote computer 128 transmits the command to the server 120 through network 124. The server 120 then converts the command into an event primitive with domain unique address, transmits the command into the appropriate protocol for the gateway 116, and sends the command to the gateway 116. The gateway 116 processes the command as discussed above. Thus, the present invention provides an efficient, effective home network solution that offers device control from a remote location, sophisticated programming, robust tolerance, all without requiring expensive processor or a continuously connected server.

The foregoing describes in details the features and benefits of the present in various embodiments. Those of skill in the art will appreciate that present invention is capable of various other implementations that operate in accordance with the foregoing principles and teachings. For example, the arrangement and organization of the central site and client terminal system may differ and the application manager, shot manager, and data files can be located elsewhere in accordance with the teachings described herein to achieve the described results and benefits. Certainly, the names of the various entities may be changed without impacting their functional operations. Accordingly, this detailed description is not intended to limit the scope of the present invention, which is to be understood by reference the claims below.

What is claimed is:

1. A system for providing network connectivity to electrical devices whose primary purpose is not computing, comprising:

an electrical device, for performing a device-specific function that is not primarily a computing function; and a node, embedded in the electrical device and communicatively coupled to at least one other node embedded in another electrical device, for enabling network-connectivity between the electrical device to which the node is coupled and the at least one other node by enabling each device to transfer messages to and receive messages from other devices in the system without requiring a connection to a server or master controller, a device driver, for causing the electrical device to perform a device attribute;

an interpreter module, for initiating execution of a device driver responsive to receiving a message requesting a device perform a device attribute; and a communications module, for translating messages to other nodes specifying a device attribute to be performed by another node into a communications protocol.

2. The system of claim 1 wherein the communications module translates messages into a communication protocol suitable for transmission over a power line.

3. The system of claim 1 wherein a device attribute is given an alias, and a node maintains an attribute-alias table mapping an alias to an attribute, and a message requesting a device to perform a feature specifies the alias for the device attribute.

4. The system of claim 3 wherein a request to have a plurality of devices perform an identical feature specifies a single alias for the feature.

* * * * *